July 24, 1923.
W. STERICKER
1,462,835
COMBINED BOARD AND METHOD OF MAKING THE SAME
Filed Jan. 4, 1921
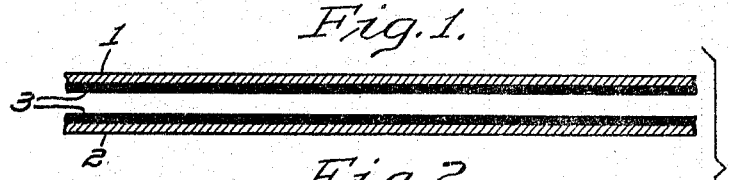
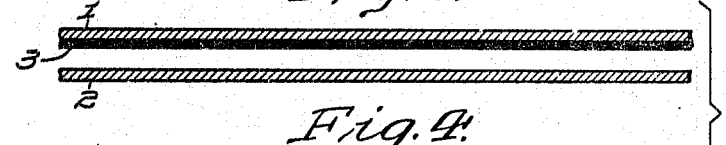
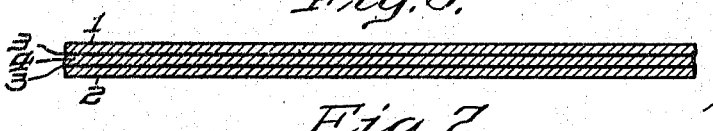
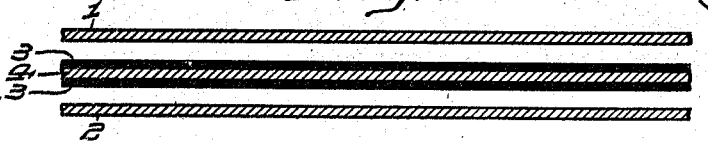
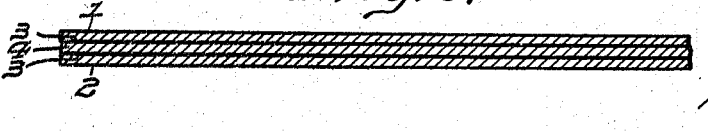
INVENTOR
William Stericker.
BY Blount, Moulton & Helbert
ATTORNEYS
WITNESS
F. J. Hartman, Patented July 24, 1923.

1,462,835

UNITED STATES PATENT OFFICE.

WILLIAM STERICKER, OF PITTSBURGH, PENNSYLVANIA, ASSIGNOR TO PHILADELPHIA QUARTZ COMPANY, A CORPORATION OF PENNSYLVANIA.

COMBINED BOARD AND METHOD OF MAKING THE SAME.

Application filed January 4, 1921. Serial No. 434,958.

*To all whom it may concern:*

Be it known that I, WILLIAM STERICKER, a citizen of the United States, and a resident of Pittsburgh, in the county of Allegheny and State of Pennsylvania, have invented certain new and useful Improvements in Combined Boards and Methods of Making the Same, of which the following is a full, complete, and exact disclosure.

My invention relates to combined boards and particularly to that kind of board known to the trade as container board which consists of a plurality of plies of paper, or similar material, united together under pressure by an adhesive.

The objects of my invention are to produce a combined board or container board, such as is used in the arts for making boxes, packages or containers of any kind, the plies or layers of which are permanently united by a sodium silicate adhesive, which will not attack the size employed for rendering the finished product waterproof and which will not stain the finished product.

Other objects of my invention will appear in the specification and claims below.

In the drawings forming a part of this specification I have shown in a more or less diagrammatic manner my improved container board during the steps of the manufacture of the same and in the completed state, the plies being shown in cross-section.

Figure 1 illustrates on an enlarged scale two plies of paper stock from which the combined board is made, the adjacent surface of said plies being coated with adhesive; Fig. 2 shows the two plies of Fig. 1 united to form a two-ply board.

Figure 3 illustrates two plies of paper stock, one of the adjacent faces of one ply being coated with the adhesive; and Fig. 4 shows these two plies united to form the finished board.

Figure 5 shows three plies of paper stock coated just prior to being combined. In this process the inner ply is coated upon its opposite faces with the adhesive while the inner surfaces only of the two other plies are coated with adhesive; and Fig. 6 shows these three plies of Fig. 5 united in a finished three-ply board.

Fig. 7 also illustrates three plies of stock prior to combining. In this case the middle ply only is provided with adhesive on its opposite faces. Fig. 8 shows the three plies of Fig. 7 combined to form the finished three-ply board.

In the manufacture of the combined board, made in accordance with my invention, any number of plies of material may be used. In Figures 1 and 2 the combined board consists of two sheets or plies 1 and 2 respectively of suitable paper or combined material, the adjacent surfaces of which are coated with a layer of adhesive 3. When these two plies are brought together in any suitable combining machine and are subjected to pressure, the two-ply board shown in Fig. 2 results. In this figure, however, the thickness of the adhesive 3 is greatly exaggerated for, as a matter of fact, it is but a film, the greater part of the adhesive having been squeezed out or absorbed in pressing together the plies.

In Figures 3 and 4 both plies 1 and 2 are shown in a relation similar to that in Figure 1, but the adhesive 3 is applied to one face only of one of the plies. When these plies are pressed together, the finished two-ply board, shown in Figure 4, results.

In Figure 5 is diagrammatically illustrated a further modification of my invention in which three plies 1, 2 and 4 are used to make the combined board, the opposite surface of the inner ply 4 being provided with the adhesive 3 and the inner surface of each of the outer plies 1 and 2 being also provided with a thin layer of adhesive 3. When these plies are pressed together a three-ply board shown in Figure 6 results.

In Figures 7 and 8 another method of making a three-ply board is diagrammatically illustrated. In this case the middle ply 4 only is provided with adhesive 3 on its opposite faces, the outer plies 1 and 2 being uncoated. When these three plies are brought together under pressure a three-ply combined board such as is shown in Fig. 8 is produced.

In connection with these combined boards it is to be understood that one of the plies or layers of stock may be corrugated, and that in the modifications shown in Figs. 5 to 8 the intermediate layer 4 may be corrugated, instead of plain, without departing from the spirit and scope of my invention.

Heretofore in making container board, it has been the practice to bring together a plurality of plies of suitable paper stock in a combining machine, of any approved type, the adjacent surfaces of the plies being coated just prior to their passage through the presser rolls of the combining machine with a silicate of soda adhesive. The strips or plies of paper which are used in making this container board are usually prepared or treated in some manner to render them waterproof, and the usual sizing used for the purpose is a rosin size. Combined board, so made from stock sized with rosin and with the plies united with the ordinary sodium silicate adhesive, has been found to be generally commercially satisfactory. A very good quality of board may be so produced. If, however, such board is required to be subjected to conditions of high humidity, the use of ordinary sodium silicate as the adhesive is open to some disadvantages. The alkalinity of ordinary sodium silicate is sufficient, under such severe conditions, to cause the silicate to affect the size, with the result that the water repelling property of the board may be reduced, and the liability of the board to stain may be increased.

The sodium silicate solution heretofore used for the purpose of uniting the plies of this container board is one in which the proportion of sodium oxid ($Na_2O$) to silica ($SiO_2$) is 1 to 3.25.

Commercial sodium silicate is a substance, the chemical content of which may vary considerably. It is formed, generally speaking, by fusing together a salt containing sodium oxid ($Na_2O$) and silica ($SiO_2$). The proportions of these two oxids which enter into the combination, make marked differences in the physical and chemical properties of the resulting sodium silicate.

The alkalinity of sodium silicate varies considerably. Commercial solutions of sodium silicate of great density are of relatively high alkalinity and solutions of low density are usually of relatively low alkalinity. This is because commercial solutions are usually prepared at the highest concentration possible, and solutions of low alkalinity cannot be concentrated to a high degree of density. This is because solutions of low alkalinity become extremely viscous at concentrations at which more alkaline silicate solutions would be thinly fluid. Such a thin fluid solution may be condensed further until it becomes viscous, which occurs at a much higher concentration.

Silicate of soda in which the relation or proportion of oxid of sodium ($Na_2O$) to silica ($SiO_2$) is as 1 of the former to 4 of the latter, is a well known form of silicate of soda. A saturated solution thereof is of a jelly-like consistency, having a density of substantially 37° Bé. Its alkalinity is, however, much less than that of the silicate of soda (1 to 3.25) which, as above stated, has been ordinarily used as the adhesive for uniting the plies of container stock.

But this jelly-like sodium silicate (1 to 4 sodium silicate) has not heretofore been regarded as suitable for use as an adhesive, on account of the fact that it is less soluble than the ordinary 1 to 3.25 sodium silicate, and the fact that when concentrated, it is of jelly-like consistency and of a non-adhesive character. A concentrated solution of this 1 to 4 sodium silicate does not lend itself to the spreading process employed in applying an adhesive to the plies of a combined board prior to their union under pressure.

I have discovered that if sodium silicate, in which the proportion of sodium oxid to silica is as 1 to 4, and the saturated solution of which is not suitable for adhesive purposes, be diluted with water until its density is substantially 34° Bé., a better adhesive for the plies of a container board is produced than the ordinary 1 to 3.25 sodium silicate solution. A 34° Bé. solution of this 1 to 4 sodium silicate, is less alkaline per unit volume than it is at 37° and is very much less alkaline than the 1 to 3.25 sodium silicate solution which, as has been above stated, has been ordinarily used for the purpose.

This new adhesive, in which the proportion of sodium oxid to silica is as 1 to 4, is more economical to use in the spreading and combining machines on which the combined board is usually formed, in that it spreads further, requires less to cover a unit of surface, sets faster and contains less of the more expensive ingredient ($Na_2O$) than does the old adhesive in which the proportion of the sodium oxid to silica is as 1 to 3.25.

In carrying out the invention, a solution of sodium silicate, in which the sodium oxid bears the proportion to the silica of 1 to 4 and in which the density is of substantially 34° Bé., is employed. This solution of silicate of soda is spread over the adjacent surfaces of the plies to be united just prior to their passage through the combining machine, and the plies so coated are pressed together in the combing machine, all as diagrammatically indicated in the drawings, forming a part of this specification. Any number of plies may be so combined and the resulting board will be better than the board ordinarily produced in that it is not liable to be effected or injured when subjected to conditions of high humidity. The board is not liable to become stained nor to lose its waterproof properties. The process is more economical than the old process, because less adhesive is required, and the cost of production is considerably reduced on account of the fact that the adhesive spreads further, and contains less of the alkali (Na₂O) than that contained in the adhesive formerly employed.

Having thus described my invention, what I claim and desire to protect by Letters Patent of the United States is:

1. The process of forming a combined board having a plurality of plies of material which consists in coating one of the adjacent surfaces of said plies with an adhesive comprising a 34° Bé. solution of sodium silicate in which the proportion of sodium oxid to silica is as 1 to 4, bringing said plies together, and applying pressure thereto to cause said adhesive to unite said plies.

2. As an article of manufacture, a combined board comprising a plurality of plies of material and an adhesive uniting said plies, said adhesive comprising a 34° Bé. solution of sodium silicate in which the proportion of sodium oxid to silica is as 1 to 4.

In witness whereof, I have hereunto set my hand this third day of January, 1921.

WILLIAM STERICKER.